Jan. 5, 1932.     L. H. FALLEY     1,840,271
CURRENT RETARDING AND DEFLECTING DEVICE
Filed Dec. 9, 1929     3 Sheets-Sheet 1
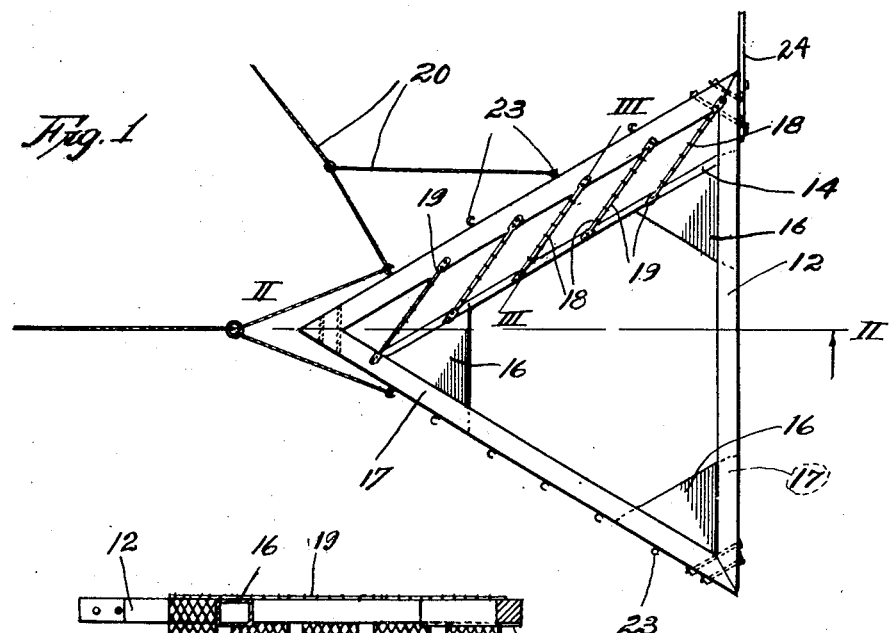
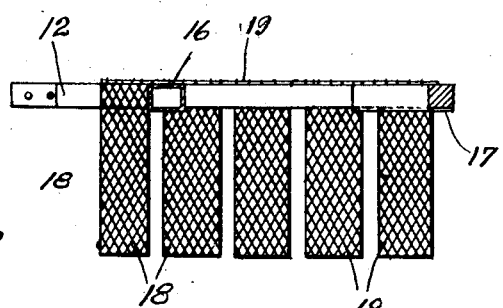
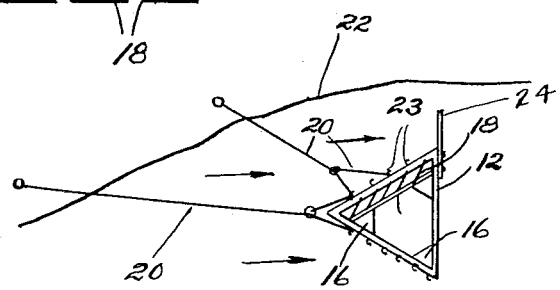
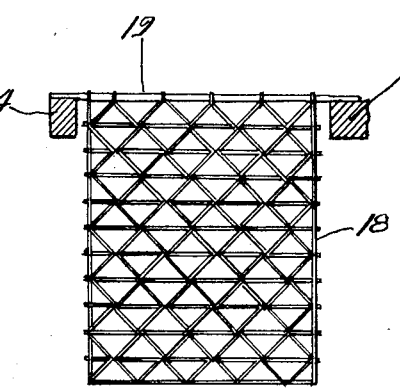
Witness:
R. E. Hamilton
INVENTOR.
Lewis H. Falley.
BY Chas W. Girard,
ATTORNEY.

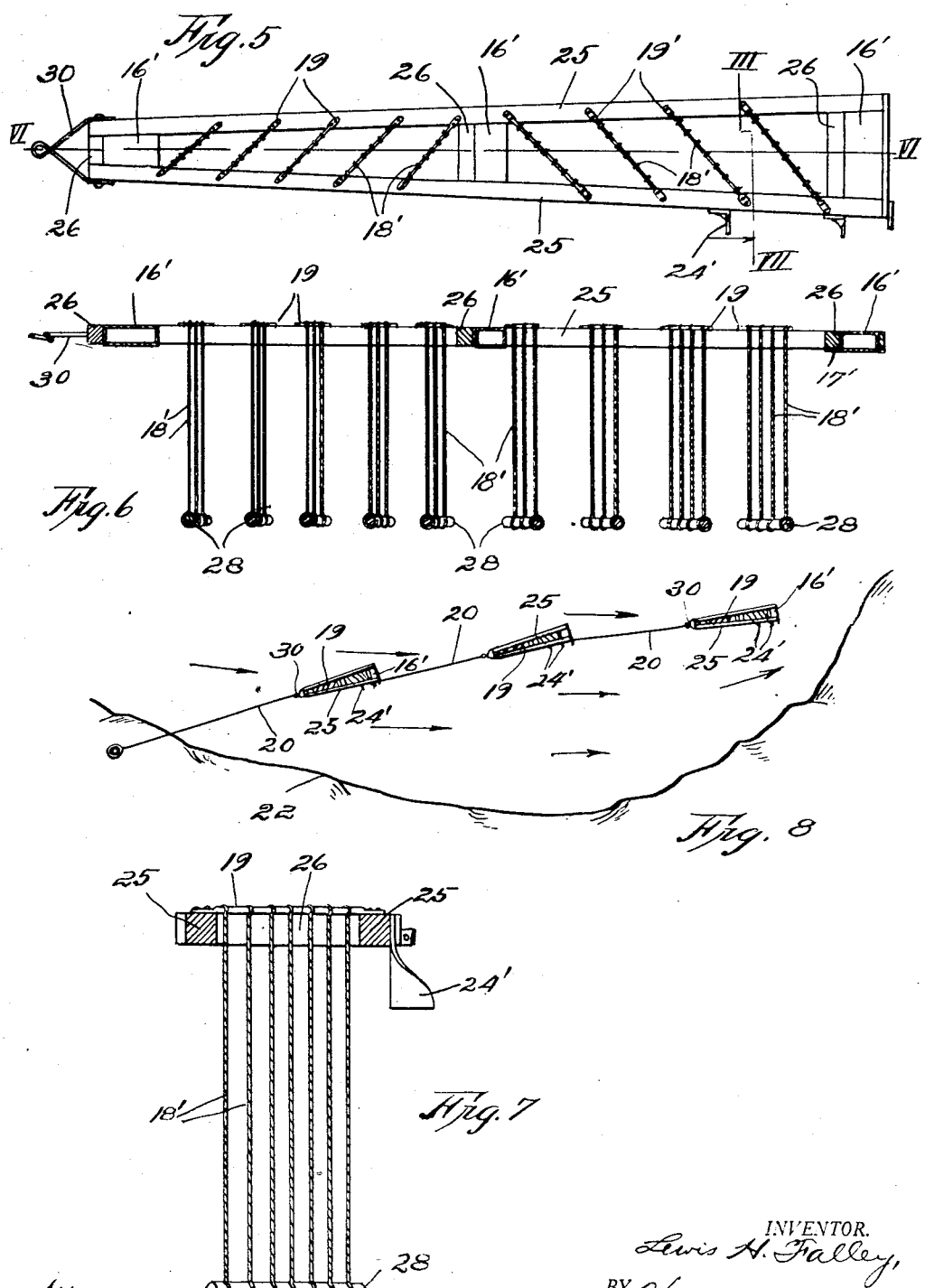

Jan. 5, 1932.  L. H. FALLEY  1,840,271
CURRENT RETARDING AND DEFLECTING DEVICE
Filed Dec. 9, 1929   3 Sheets-Sheet 3
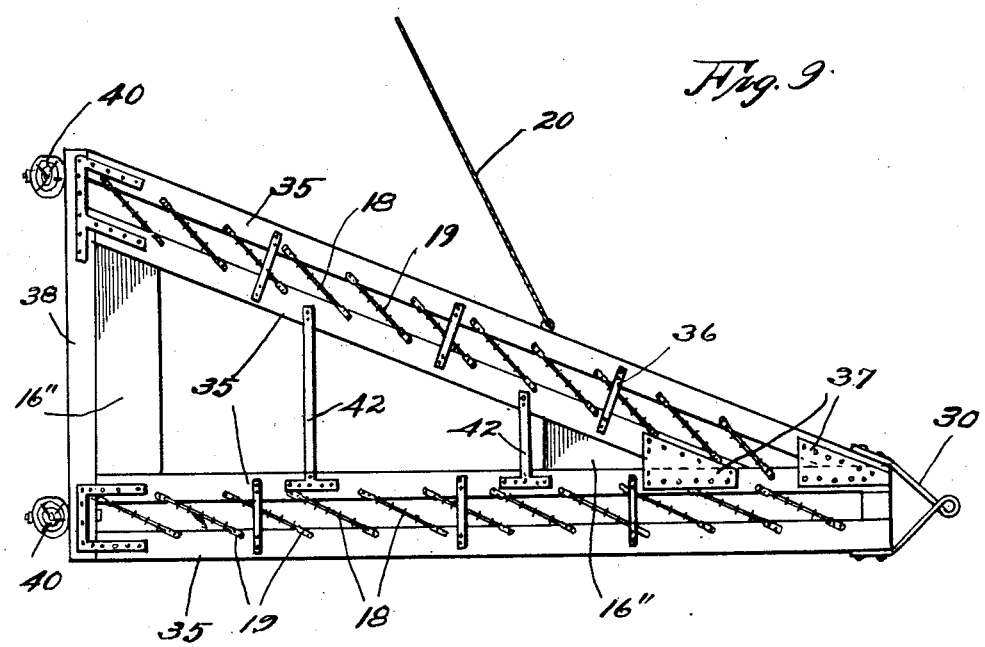
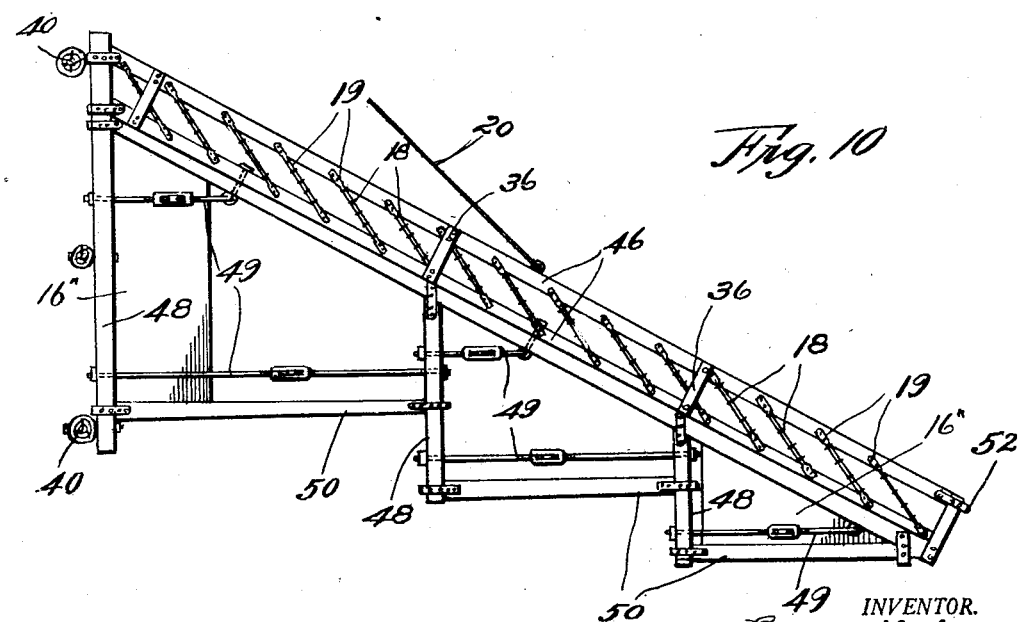
INVENTOR.
Lewis H. Falley,
BY Chas. W. Gerard,
ATTORNEY.

Patented Jan. 5, 1932

1,840,271

UNITED STATES PATENT OFFICE

LEWIS H. FALLEY, OF KANSAS CITY, MISSOURI, ASSIGNOR TO M. H. FALLEY, OF KANSAS CITY, MISSOURI

CURRENT RETARDING AND DEFLECTING DEVICE

Application filed December 9, 1929. Serial No. 412,806.

The present invention relates to apparatus for use in waterways, streams and the like, and aims to provide an improved jetty construction adapted to retard or so modify the current flow of streams and rivers as to effect the precipitation of finely divided solids that are carried in suspension, and also, when desired, to deflect the water current which is intercepted by the apparatus, and thereby protect the bank or shoreline adjacent to which the apparatus is installed for operation.

For carrying out this general object of the invention, I have devised an apparatus which comprises a supporting member adapted to be floated upon the surface of the stream or waterway, and carrying one or more of the current retarding members which are suspended from the framework in submerged relation for intercepting the current flow, together with suitable means for anchoring the framework with the retarding members presented at the proper angle to the current. In its preferred form, the retarding elements of the apparatus are constructed of appropriate network material, of a flexible character and suspended for free swinging movement from the framework, the latter being equipped with suitable buoyant devices for sustaining it above the surface of the water.

It is also sought to devise an apparatus of this character which can be readily constructed in different sizes to suit any required condition, either as to the width of current to be intercepted, as well as the depth to which the operation is to be extended. It is further sought to provide a construction adapted to be produced in unit assemblies which may be combined in any number of units for meeting varying conditions of operation.

It is a further object of the invention to devise an improved construction adapted to be manufactured economically from ordinary and inexpensive materials, with ordinary skill and labor.

With the foregoing general objects in view, the invention will now be described by reference to the accompanying drawings illustrating certain forms of embodiment of the invention, which I have found to be practical and efficient, after which those features and combinations deemed to be novel will be particularly set forth and claimed.

In the drawings—

Figure 1 is a plan view illustrating a current retarding and deflecting apparatus constructed in accordance with the present invention;

Figures 2 and 3 are sectional views taken on the lines II—II and III—III respectively of Figure 1;

Figure 4 is a plan view, on a reduced scale, illustrating the position of the apparatus in operative relation to a bank or shore;

Figure 5 is a plan view illustrating one unit of a modified form of construction;

Figures 6 and 7 are longitudinal and transverse sectional views, taken on the lines VI—VI and VII—VII respectively of Figure 5, Figure 7 being on an enlarged scale;

Figure 8 is a plan view, on a reduced scale, illustrating several units of said modified form anchored in operative relation to a bank or shoreline; and Figures 9 and 10 are additional plan views illustrating other modified forms of construction embodying the invention.

Referring now to the drawings in detail, and primarily to that form of the construction illustrated in Figures 1 to 4, these show the apparatus as comprising a triangular frame 12, two sides of which are connected by a cross member 14 extending parallel and in spaced relation to the third side of the frame 12, as clearly shown in Figure 1. This frame construction is for the purpose of supporting a series of current retarding and deflecting members in submerged relation to the stream or waterway, in which operation the frame is required to float upon the surface of the water, and accordingly is provided with a set of air or gas tanks 16, preferably mounted in the various corners of the frame with which it is engaged by means of suitable flanges 17 formed on the sides of the tanks and projecting beneath the framework (see Figure 2).

The current deflecting and retarding members referred to comprise curtains of network material 18 having their upper ends attached to rods or cross bars 19 extending in spaced, parallel relation across the space between the cross member 14 and that side of the frame 12 parallel to said cross member 14, the latter serving to support one end of each of the bars 19, the other ends of which are attached to the cross member 14, as shown in Figures 1 and 4. The deflecting members or curtains 18 are preferably constructed of any suitable flexible material, such as rope, cording, chains, or the like, or even expanded metal, or any perforated sheet material, which may be employed to produce a reticulated screen or network, so that in some cases the foliage of shrubs or small trees may be suspended from the frame 12 for functioning in the same manner as the illustrated form of curtains or screens 18.

The apparatus is designed to be anchored in the proper position for presenting the retarding or deflecting screens or curtains 18 at the proper angle to the current of the stream, by means of anchoring ropes or cables 20 which are connected from any desired point on the bank or shore 22 (see Figure 4), said cables 20 being attached by means of hooks 23, a series of which are provided on opposite sides of the framework 12, whereby the angle at which the device is presented to the current may be conveniently adjusted. For cooperating with the cable anchoring means just described, the frame 12 is also provided with a blade or fin 24, attached to one corner of the framework, in position for intercepting the current flow, and thereby assisting in maintaining the frame in proper operative position.

By means of this construction, it is apparent that the apparatus will float upon the surface of the stream or waterway, and at an appropriate angle to the current for holding the apparatus at a suitable distance away from the bank or shore, and with the current retarding and deflecting members 18 submerged below the surface for intercepting the current and, in a well understood manner, producing the desired precipitation of the sand, silt and other matter suspended in the water and thereby constructing a bed or bank of such precipitated material, while at the same time protecting the bank or shoreline adjacent to which it is put into operation.

In Figures 5 to 8, inclusive, I illustrate a modified form of construction comprising a frame of somewhat oblong and slightly tapering form, constructed of the longitudinal members 25 connected by transverse frame pieces 26 adjacent to which are located the air or gas tanks 16' for imparting the requisite buoyancy to the framework. Cross bars 19 are arranged in parallel relation between the frame members 25, for carrying the current retarding and deflecting screens 18' as in the preceding construction, a modified form of screens or curtains being illustrated in these views, as comprising swinging cords suspended from said cross bars 19 and weighted down by means of bars 28 attached to the lower ends of the cords, and sufficiently heavy to maintain the latter in submerged relation. A pivoted bail member 30 is attached to the narrower end of the frame 25, the other end of which is provided with a number of current intercepting blades or fins 24' for functioning in the same manner as the fins or blades 24 of the preceding construction. This modified form is of a type adapted to be operated either as a single unit, or in a series of units connected together by means of cables 20 as illustrated in Figure 8, let out from the bank or shore 22, with the series of units swinging into the direction of the current as denoted by the arrows in Figure 8, the fins or blades 24' cooperating with this anchoring means to maintain the assembly of units away from the shoreline, in an obvious manner. It is also noted that, in this construction, the current retarding and deflecting elements are adapted to be arranged in different series located at different angles, as clearly represented in Figure 5, to suit the required conditions of operation, as for balancing the action of the different series of retarding members with reference to the current flow and thereby controlling the distribution of the material being precipitated thereby.

In Figure 9 I illustrate another modified form of construction, comprising a triangular framework, two sides of which are constructed of spaced parallel longitudinal members 35, each pair of said frame members 35 thus serving to support a series of the current retarding and deflecting screens or curtains 18 which are carried by the rods 19 having their opposite ends supported by the parallel frame members 35, and said screens or curtains 18 being thus suspended between each of the pairs of frame members 35. Each pair of frame members 35 is suitably braced by cross cleats 36, and are connected at one end of the framework by means of plates 37, to which end of the framework is also connected a bail 30, for use in the same manner as in the preceding construction for connecting two or more units of the apparatus in a series. At the opposite ends of the members 35, they are connected by cross frame piece 38 whereby the frame may be anchored to suitable piling 40, and an anchoring cable 20 may also be attached to an intermediate point of the frame, as illustrated. The framework may be further braced by means of intermediate cross pieces 42, and is also equipped with the air or gas tanks 16" for affording the same the required buoyancy for flotation purposes.

Still another form of the construction is illustrated in Figure 10, in which the framework comprises parallel spaced longitudinal members 46 for supporting the spaced parallel cross bars 19 carrying the curtains or screens 18 which are suspended in the space between the longitudinal members 46. These also are suitably braced by the cross cleats 36 as in the last preceding form of construction, and are further adapted for being located at an angle to the water current by means of the additional framework comprising the parallel frame members 48 connected to one of said longitudinal members 46 and to each other by means of the series of turnbuckle rods 49 and the secondary longitudinal frame pieces 50. As explained in connection with the modified form of Figure 9, one of the frame members 48 may be anchored to piling 40, and an anchoring cable 20 may be attached to an intermediate point of one of the frame members 46, for positioning the apparatus in proper relation to the current flow to be intercepted, this flow being represented by the arrows in Figure 10. Likewise, this unit is also adapted to be connected in a series of two or more units, by means of clips 52 and cables (not shown) connecting the same with adjoining units.

It will thus be seen that I have devised a practical and efficient construction for embodying the invention and carrying out the desired objects of the same. In its operation, the type of current retarding and deflecting element is such as not to deflect a large extent or body of water enmasse with resultant destructive eddies, but effects only a slight retarding of the current flow, so that the materials held in suspension in the water are precipitated and deposited over any desired predetermined area, any number of the units being operated, in series or otherwise, to conform to the area or extent of the operations to be carried out. For this purpose, the units may be connected end to end, or operated side by side, as may be deemed best adapted for producing the result desired, within the limits of the area to be treated. While I have illustrated certain triangular or oblong forms of construction, it is to be understood that I do not limit the invention to any particular form of framework or arrangement of the curtains or screens serving as the current deflecting or retarding elements, as these frame members can be constructed in any appropriate form according to the conditions met with, and the deflecting or retarding elements suspended at any desired angle best suited to these conditions. The described construction can be cheaply manufactured, from any suitable materials, and if desired any floating type of support, such boat, raft or pontoon, may be employed for floating the retarding and deflecting structure, and anchoring this at the requisite angle to the water current.

While I have illustrated and described what I have found to represent practical forms of embodiment of the invention, I therefore do not desire to be limited to these illustrated forms, but reserve the right to make all such changes or modifications as may fairly fall within the scope of the appended claims.

What I claim is:

1. In a current retarding means, a supporting framework comprising a plurality of frame pieces, two of said frame pieces being in spaced parallel relation, a plurality of cross bars mounted in spaced parallel relation upon said parallel frame pieces and in angular relation thereto, and curtains of flexible network material suspended for free swinging movement from said cross bars.

2. In a current retarding means, an open supporting framework, one side of said framework comprising two frame pieces in spaced parallel relation, a plurality of cross bars mounted in spaced parallel relation upon said parallel frame pieces and in angular relation thereto, curtains of flexible network material suspended for free swinging movement from said cross bars, and a series of attaching devices carried by two sides of the framework for anchoring said framework in position for carrying said curtains in submerged relation.

3. In a current retarding means, an open supporting framework, one side of said framework comprising two frame pieces in spaced parallel relation, a plurality of cross bars mounted in spaced parallel relation upon said parallel frame pieces and in angular relation thereto, curtains of flexible network material suspended for free swinging movement from said cross bars, and hollow tank elements secured within the interior corners of said framework for supporting the same upon the water surface.

4. In a current retarding means, a supporting framework comprising a pair of longitudinal frame pieces in spaced parallel relation, a plurality of cross bars mounted in spaced parallel relation upon said parallel frame pieces and in angular relation thereto, curtains of flexible network material suspended for free swinging movement from said cross bars, a series of parallel frame members connected in transverse relation to one of said longitudinal frame pieces and to each other, and a series of turnbuckle rods connecting said transverse frame members with said framework for adjustable embracing engagement therewith.

In witness whereof I hereunto affix my signature.

LEWIS H. FALLEY.